United States Patent
Harrison

(10) Patent No.: US 7,502,670 B2
(45) Date of Patent: Mar. 10, 2009

(54) SYSTEM AND METHOD FOR DETERMINING RAIL SAFETY LIMITS

(75) Inventor: Harold Harrison, Powell, OH (US)

(73) Assignee: Salient Systems, Inc., Dublin, OH (US)

( * ) Notice: Subject to any disclaimer, the term of this patent is extended or adjusted under 35 U.S.C. 154(b) by 219 days.

(21) Appl. No.: 10/899,265

(22) Filed: Jul. 26, 2004

(65) Prior Publication Data

US 2006/0020375 A1 Jan. 26, 2006

(51) Int. Cl.
- G01B 5/30 (2006.01)
- G06F 11/30 (2006.01)
- G06F 19/00 (2006.01)

(52) U.S. Cl. .............. 701/1; 702/34; 702/35; 702/182; 701/19

(58) Field of Classification Search .......... 701/20, 701/1, 19; 246/120; 73/760, 788, 64.48, 73/786, 787, 146; 264/1 R, 41, 473; 238/1, 238/122; 33/1 Q, 545, 561; 404/83; 702/34, 702/35, 38, 39, 42, 182; 340/870.05, 870.26

See application file for complete search history.

(56) References Cited

U.S. PATENT DOCUMENTS

| | | | | |
|---|---|---|---|---|
| 4,755,238 A | * | 7/1988 | Deroche et al. | 148/320 |
| 5,386,727 A | * | 2/1995 | Searle | 73/602 |
| 5,529,267 A | * | 6/1996 | Giras et al. | 246/120 |
| 5,680,054 A | * | 10/1997 | Gauthier | 324/713 |
| 5,713,540 A | * | 2/1998 | Gerszberg et al. | 246/121 |
| 5,743,495 A | * | 4/1998 | Welles et al. | 246/121 |
| 5,992,241 A | | 11/1999 | Posgay et al. | |
| 6,026,687 A | * | 2/2000 | Jury | 73/582 |
| 6,216,985 B1 | * | 4/2001 | Stephens | 246/120 |
| 6,570,497 B2 | | 5/2003 | Puckette, IV et al. | |
| 6,951,132 B2 | * | 10/2005 | Davenport et al. | 73/598 |
| 7,164,975 B2 | * | 1/2007 | Bidaud | 701/19 |
| 2001/0045495 A1 | * | 11/2001 | Olson et al. | 246/121 |
| 2004/0122569 A1 | | 6/2004 | Bidaud | |
| 2006/0059992 A1 | * | 3/2006 | Jury | 73/579 |

OTHER PUBLICATIONS

International Search Report and the Written Opinion from PCT/US2005/026384, filed Jul. 26, 2005.

\* cited by examiner

*Primary Examiner*—Thomas G Black
*Assistant Examiner*—Christine M Behncke
(74) *Attorney, Agent, or Firm*—McNees, Wallace & Nurick LLC

(57) ABSTRACT

Methods, systems, and apparatus are disclosed for determining rail safety limits. A first example method is disclosed for determining rail safety limits, including identifying a target rail neutral temperature for a portion of continuous welded rail. The method also includes monitoring a longitudinal stress for the portion of continuous welded rail and monitoring an ambient rail temperature for the portion of continuous welded rail. The method further includes determining a present rail neutral temperature based on the longitudinal stress and the ambient rail temperature. According to the example method, the present rail neutral temperature is compared to the target rail neutral temperature to determine whether a failure of the portion of continuous welded rail has occurred, and an alert is reported if the difference between the present rail neutral temperature and the target rail neutral temperature is within a predetermined range. Other methods, apparatus, and systems are disclosed for presenting determining rail safety limits.

12 Claims, 6 Drawing Sheets

SYSTEM AND METHOD FOR DETERMINING RAIL SAFETY LIMITS

TECHNICAL FIELD

The described systems and methods are generally related to information processing environments for monitoring longitudinal stresses in continuously welded steel rails ("CWR"). More specifically, the described systems and methods are related to processing monitored stress levels to determine limits of rail safety.

BACKGROUND

Over the last forty years, an effort has been underway to eliminate the mechanical joints in railroad tracks. That effort has largely involved constructing tracks having continuous rails by welding or otherwise joining together the ends of the adjacently spaced rail sections, forming a structure sometimes referred to as continuous welded rail track. The technology associated with the construction of CWR track is well known in the prior art.

Because all of the rail sections of continuous rail track are connected, continuous rail track can be particularly sensitive to fluctuations in the ambient temperature of the track and surrounding environment, such as seasonal variations in the ambient temperature resulting in variations in the rail temperature. In tropical climates, the ranges between the temperature extremes are generally moderate, which does not pose a substantial problem for rail systems. In temperate climates, however, such as those in the United States, Asia, Australia and Europe, the ranges of temperature extremes are sufficient to cause catastrophic, temperature induced failures in rail systems, including both rail pull-apart and track-buckle failures, as hereinafter described.

For example, an unanchored 100-mile length of continuous rail in certain areas of a temperate climate could experience a change in length of over 600 feet from one seasonal temperature extreme to the other. By anchoring the rail to railroad ties, changes in the overall length of the rail can be largely prevented but, instead, resultant localized longitudinal stresses are created internally in the rail.

As the rail segments of CWR track are initially installed and anchored to a road bed, each of the rails has zero longitudinal stress. The temperature at which the continuous rail track is installed is sometimes referred to as the rail neutral temperature ("RNT").

As the ambient rail temperature falls below the RNT, tensile longitudinal stresses are created internally in each rail segment of the continuous rail track due to the greater thermal coefficient of expansion of the metal rails relative to that of the underlying road bed. If the difference between the reduced ambient rail temperature and the RNT is extreme, the tensile stresses in the rails can potentially attain sufficient magnitude to actually cause rail segments in one or both continuous rails to pull apart. Fortunately, pull-apart failure can easily be detected by establishing an electrical track circuit using the rails as part of the conduction path, which becomes "open" if one of the rails of the continuous rail track pulls apart.

Likewise, as the ambient rail temperature climbs above the RNT, compressive stresses are created internally in each of the rails of the continuous rail track. If the difference between the elevated ambient rail temperature and the RNT is extreme, the compressive stresses in the rails can potentially attain sufficient magnitude to actually cause the track panel to buckle. The compressive stress required to cause any particular rail to buckle depends on a number of factors, including the absolute temperature, the difference between the ambient rail temperature and the RNT, and the condition of the ballast, for example.

Such buckling, previously considered random and unpredictable, is a major source of derailments. The ability of a train to negotiate a lateral track panel displacement, which is typical of track-buckle, is minimal. As a result, track-buckle poses a substantially greater risk of derailment than does a rail pull-apart since the former cannot be detected by a conventional track circuit.

Although various methods, systems and apparatus have been developed to measure and/or determine longitudinal stresses in a rail of a continuous rail track, none of them have been used to accurately determine whether a section of continuous rail track is within specific safety limits. Consequently, there is a need for systems and methods that address the shortcomings of prior art rail stress identification and provide a more accurate determination of rail performance within prescribed safety ranges.

SUMMARY

The following presents a simplified summary of methods, apparatus and systems, associated with determining rail safety limits in accordance with the present application. This summary is not an extensive overview and is not intended to identify key or critical elements of the methods, apparatus and/or systems or to delineate the scope of the methods, apparatus and systems. It conceptually identifies the methods, apparatus and systems in a simplified form as a prelude to the more detailed description that is presented later.

In accordance with one aspect of the present application, an example method is disclosed for determining rail safety limits. The example method includes determining a target rail neutral temperature for a portion of continuous welded rail. The method also includes monitoring a longitudinal stress for the portion of continuous welded rail and monitoring an ambient rail temperature for the portion of continuous welded rail. The method further includes determining a present rail neutral temperature based on the longitudinal stress and the ambient rail temperature. According to the example method, the present rail neutral temperature is compared to the target rail neutral temperature to determine whether a failure of the portion of continuous welded rail has occurred, and an alert is reported if the difference between the present rail neutral temperature and the target rail neutral temperature is within a predetermined range. An example apparatus is also disclosed for performing the method.

In accordance with a second aspect of the present application, an example method is disclosed for determining rail safety limits. The example method includes monitoring an ambient rail temperature for a portion of continuous welded rail, and monitoring a longitudinal stress for the portion of continuous welded rail. The method also includes determining a rail neutral temperature for the portion of continuous welded rail and determining a yield strength of a ballast supporting the portion of rail. The method further includes determining a high temperature buckling threshold associated with the portion of rail. The high temperature buckling threshold is a function of the yield strength, the rail neutral temperature and the longitudinal stress for the portion of the rail. According to the example method, the ambient rail temperature is compared to the high temperature buckling threshold to determine a temperature difference, and an alert is reported if the temperature difference is within a predetermined range. An example apparatus is also disclosed for performing the method.

In accordance with a third aspect of the present application, an example system is disclosed for monitoring rail portions. The system includes a plurality of rail portion stress monitoring devices, and at least one receiver in communication with the plurality of rail stress monitoring devices. The receivers are operative to receive rail stress data from the rail stress monitoring devices. The receivers are further operative to transmit the rail stress data to a rail stress processing apparatus. The rail stress processing apparatus is in communication with the receivers, and is operative to evaluate rail stress data. The rail stress monitoring apparatus is further operative to report alerts based on the rail stress data.

Certain illustrative aspects of the methods, apparatus and systems are described herein in connection with the following description and the annexed drawings. These aspects are indicative, however, of but a few of the various ways in which the principles of the methods, apparatus and systems may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
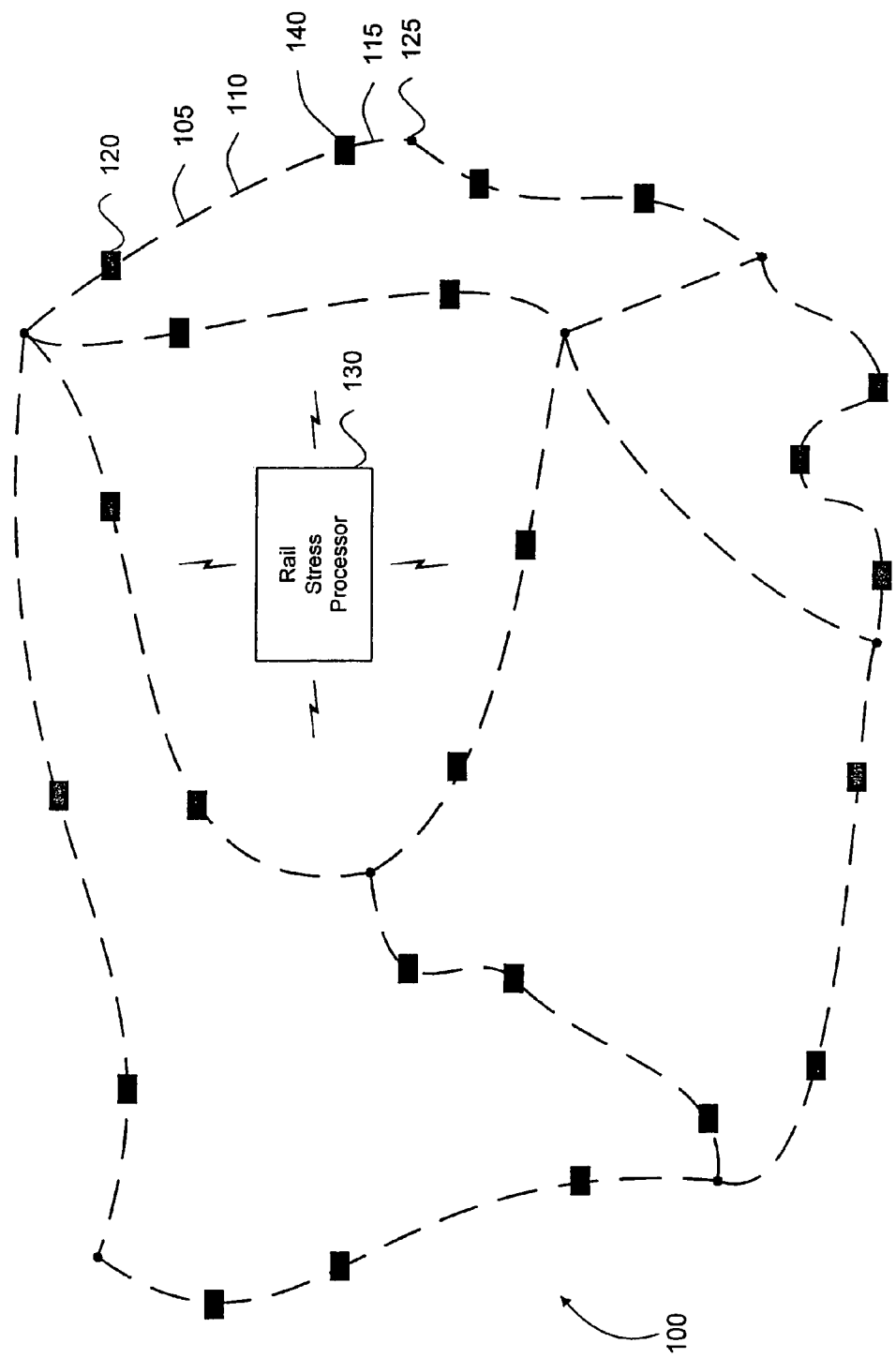
FIG. 1 is a schematic diagram illustrating an example network of continuous rail track, in accordance with the systems and methods described in the present application.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

Referring to FIG. 1, a schematic diagram illustrates an example network 100 of continuous rail track. The illustrated continuous welded rail track network 100 includes a plurality of CWR track portions, such as rail portions 105, 110, and 115, for example. The CWR track portions create paths between certain nodes, such as the path between nodes 120 and 125. Certain of CWR track portions, such as rail portion 115, for example, include a rail stress monitoring device such as rail stress monitoring device 140. Each rail stress monitoring device is designed to measure or otherwise determine an amount of internal stress within a rail portion and report such internal stress to a rail stress processor 130.

Figure 2:
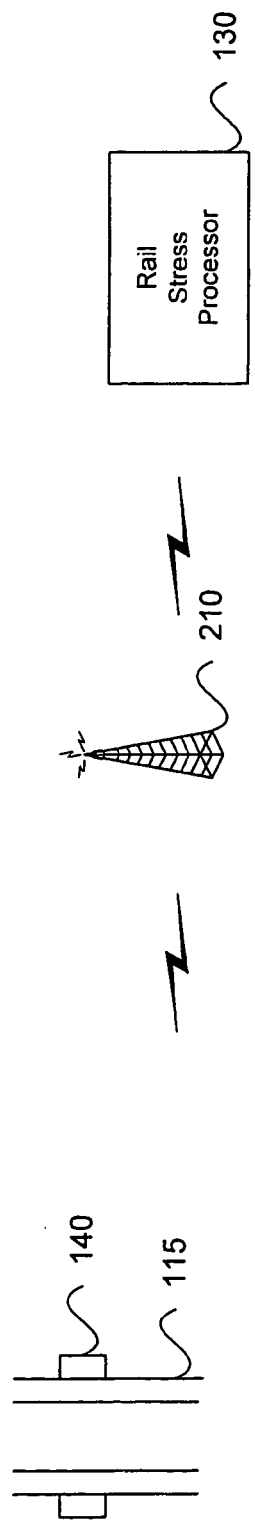
FIG. 2 is a schematic diagram illustrating example communication between certain components of FIG. 1.

Referring now to FIG. 2, there is illustrated a more detailed view of certain components of continuous rail track network 100. As shown, rail stress monitor 140 corresponding to rail portion 115 determines the internal stress of rail portion 115 and transmits the rail stress data to rail stress processor 130 via signaling tower 210.

Of course, the illustrated communications means is merely one example of a variety of ways for rail stress monitors such as monitor 140 to communicate with rail stress processor 130. Examples of other communications means include direct wired communication, satellite, microwave, cellular, any other form of wireless communication, and communication over the Internet, for example. Examples of still other means for communicating monitored data from monitor 140 to rail stress processor 130 include transmission via rail vehicle and manual collection of data from monitor 140 by railway personnel in conjunction with subsequent manual input of such data to rail stress processor 130.

Data collected and reported by monitor 140 includes measured longitudinal stress of a CWR track portion or CWR track panel Other data that may be collected and reported by monitor 140 includes ambient rail temperature, rail temperature, date, time, vibration and RNT, for example.

Figure 3:
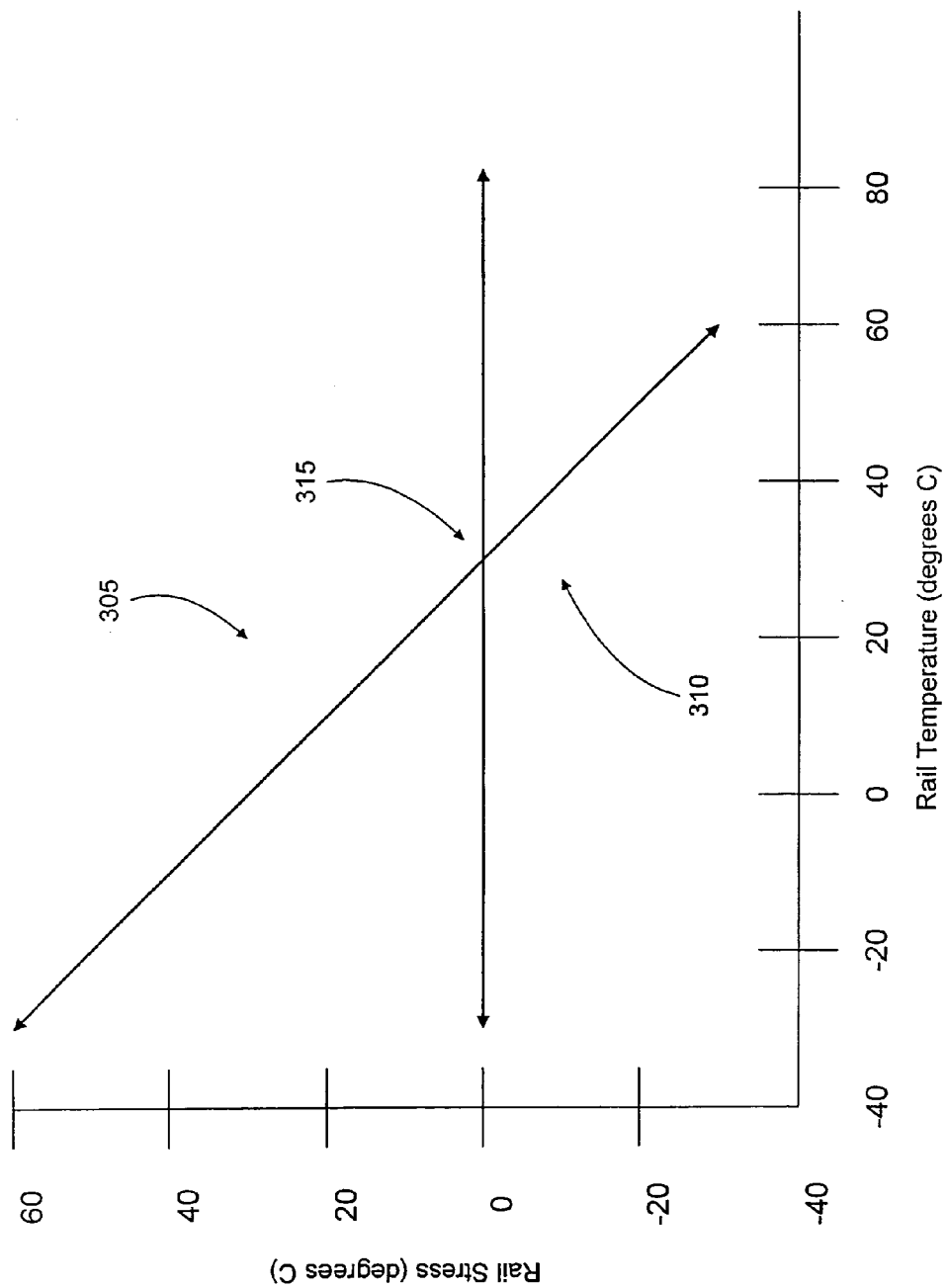
FIG. 3 is a graph illustrating the relationship of longitudinal rail stress to the temperature difference between rail neutral temperature and ambient rail temperature.

Referring now to FIG. 3, there is an example graph illustrating the relationship of longitudinal rail stress to the temperature difference between RNT and ambient rail temperature. As illustrated, the graph charts rail temperature in degrees Celsius along the horizontal axis, and a corresponding rail stress representation in degrees Celsius along the vertical axis. Although rail stress is typically represented in units such as pounds per square inch, for example, the present application recognizes that representing rail stress in terms of degrees greatly simplifies comprehension of the relationships among rail stress, ambient rail temperature and RNT. According to the graph of FIG. 3, rail stress in degrees Celsius can be determined according to the following formula:

Let:
RS=Rail Stress (in degrees Celsius)
RNT=Rail Neutral Temperature (in degrees Celsius)
AT=Ambient rail temperature (in degrees Celsius)

$$RS = RNT - AT$$

In other words, the rail stress charted by the graph of FIG. 3 is that rail stress (RT) is the number of degrees that the ambient rail temperature (RT) is away from the rail neutral temperature (RNT). This linear relationship is depicted at reference numeral 350. The horizontal function depicted at reference numeral 360 represents an the stress of unconstrained portion of rail. Due to the unconstrained state of the rail portion, regardless of the ambient rail temperature, the rail stress is zero. In other words, the RNT of an unconstrained rail is always equal to the ambient rail temperature.

In region 305 of the illustrated example, where the rail temperature is below its RNT, the rail is under tensile stress which tends to result in pull-apart rail failures. The rail stress in the region 310, above its RNT, represents a compressive rail stress which tends to result in track buckle failures. By definition, RNT 315 can be determined using the graph by identifying the point at which there is zero rail stress. On the illustrated graph, the RNT 315 for the example CWR track equals 30 degrees Celsius.

Figure 4:
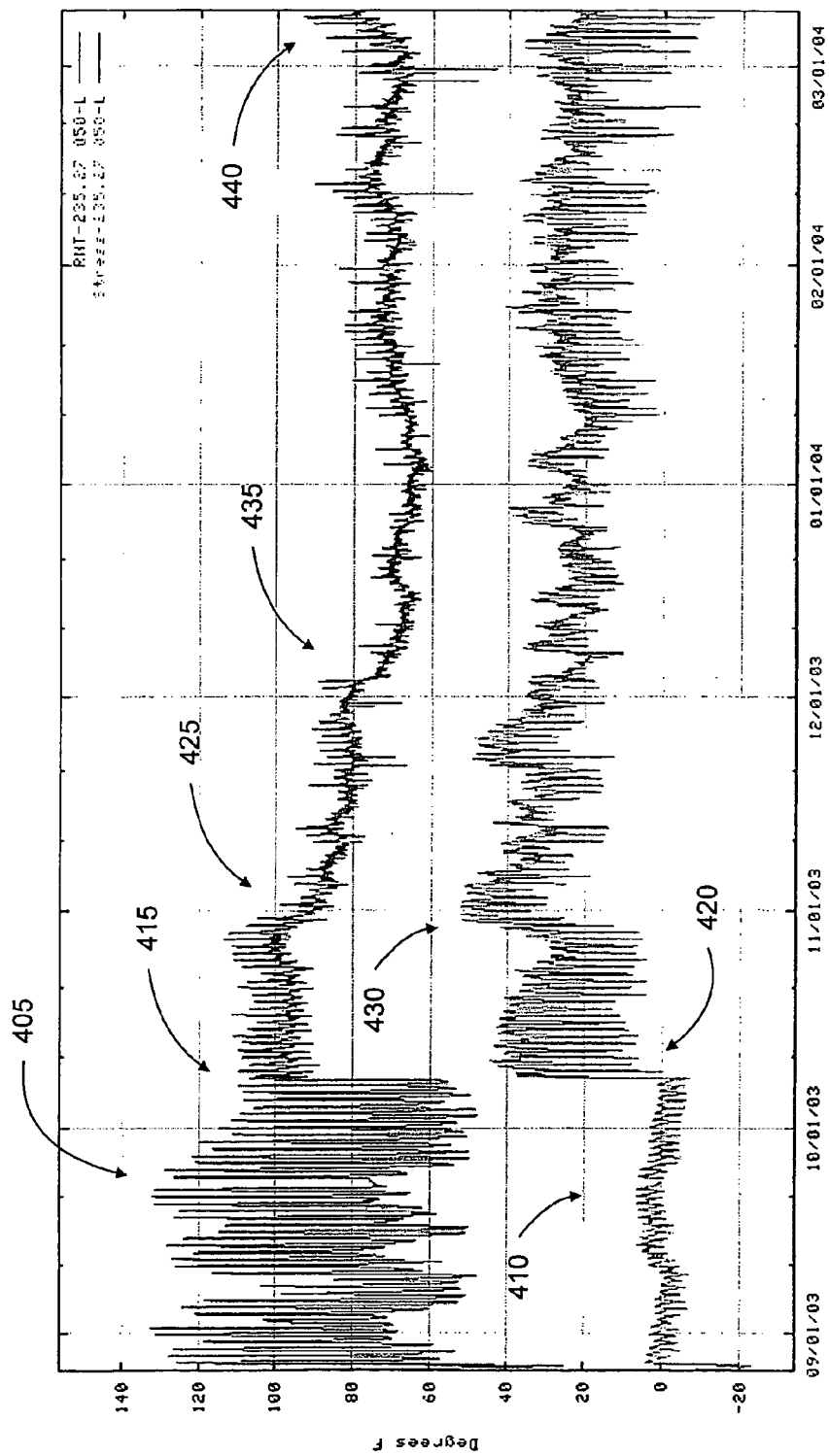
FIG. 4 is a graph of longitudinal stress and RNT for a CWR track panel.

Referring now to FIG. 4, there is illustrated a graph charting RNT and longitudinal stress, in degrees Fahrenheit of a CWR track panel over time. The first portion of the graph, as indicated by reference numerals 405 and 410, represents readings taken prior to securing the CWR rail to the rest of the track. As illustrated, the RNT fluctuates with the ambient rail temperature of the rails throughout each day. Similarly illustrated, the monitored stress in degrees Fahrenheit, also expressed as the difference between the ambient rail temperature and the RNT, is zero. These readings indicate that there is no longitudinal stress on the CWR track panel, which is consistent with the unconstrained condition of the CWR rails prior to installation.

At reference numeral 415, the point at which the CWR rail is constrained, there is illustrated a more constant reading of RNT at approximately 100 degrees. Similarly, at reference numeral 420, the graph depicts a sharp increase in the amount of peak nighttime longitudinal rail stress that remains constant at approximately 30 to 40 degrees for some time. This sudden increase and positive (tensile) rail stress value is consistent with attaching the CWR track panel to the ballast and constraining the CWR track panel within adjacent CWR track panels.

At reference numeral 430, there is depicted a sharp increase in longitudinal rail stress, and a corresponding decrease in the RNT at reference numeral 425. In theory, once the CWR track panel is constrained, the RNT should remain constant for the life of the CWR track panel. In practice, however, a number of factors may affect the RNT. Some changes in the RNT may be temporary, while others may be permanent. For example, the ballast supporting a CWR track panel may adjust over time, causing the CWR track panel to shift or otherwise change its position. Such an adjustment, typically due to entropy and/or other natural forces, may relieve the CWR track panel of stress. The reduced level of stress affects the RNT for as long as the CWR track panel remains in the shifted position.

At reference numeral 425, the graph illustrates a drop in RNT to approximately 80 degrees Fahrenheit, and it fails to rebound back to 100 degrees Fahrenheit for the remainder of the monitored duration. Such fluctuations in RNT over time may represent plastic or elastic changes in the rail portion. Plastic changes are more permanent, while elastic changes may be reversed, at least in part.

At reference numeral 435, it appears as though some factor affected the monitored RNT of the CWR track panel. From the data provided, it is unclear whether the change in RNT at 435 was a plastic or elastic change. At reference numeral 440, a corresponding change in RNT appears to have occurred which could suggest that the change at 435 was an elastic change. Of course, the changes at 435 and 440 could have been unrelated elastic changes which simply happen to be in opposite orientations.

Monitoring of longitudinal stress levels alone does not provide the same breadth of information regarding the state of any particular CWR track panel. The predictive and/or preventative advantages of the present invention are derived through the collection and/or analysis of the longitudinal stress, ambient rail temperature, RNT, and in some cases the ballast conditions. Analysis of these data enable prediction of maintenance conditions, or so-called "soft" failures, and safety conditions or so-called "catastrophic" failures.

Figure 5:
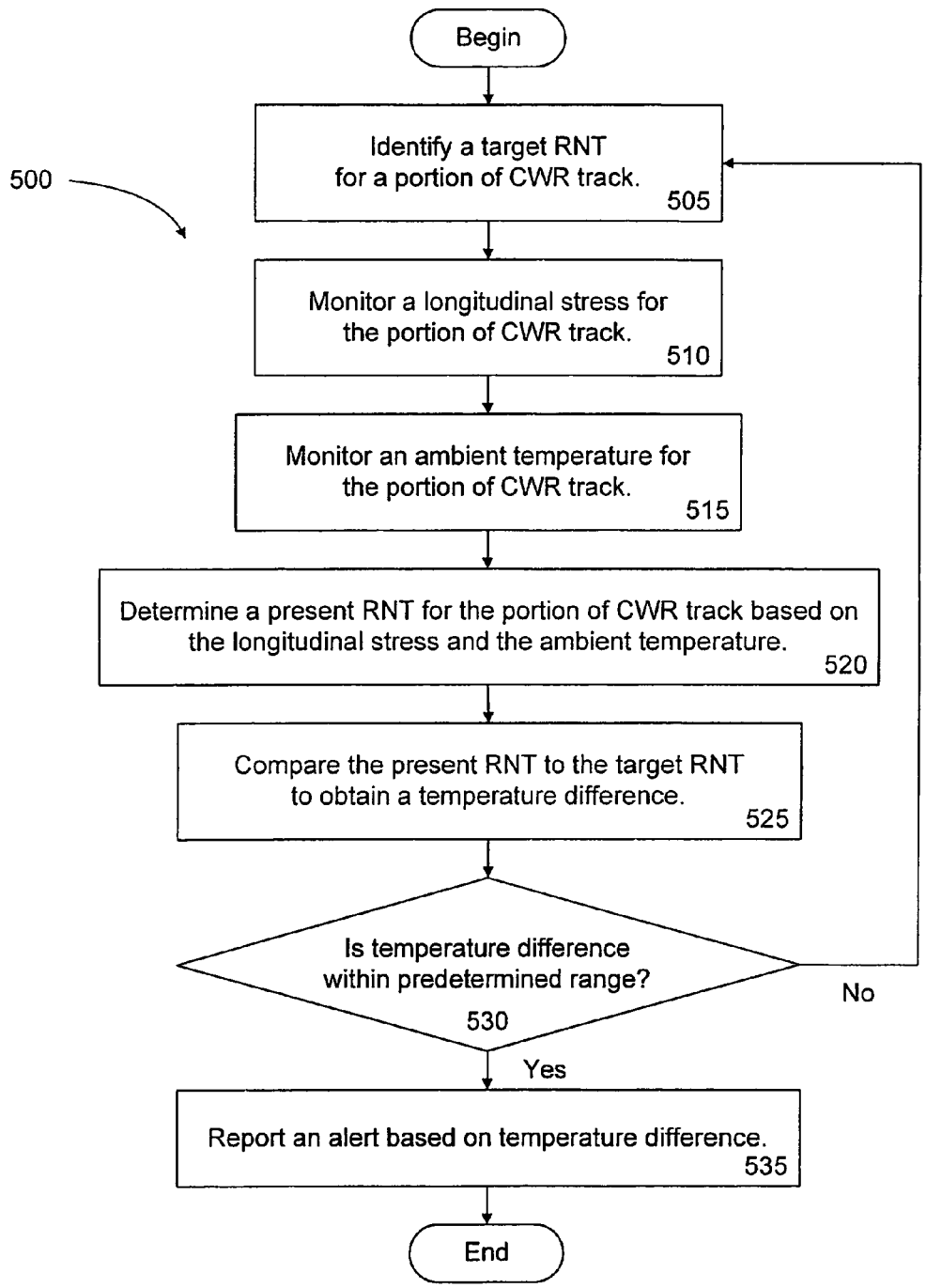
FIG. 5 is a flow chart illustrating a first example methodology for determining rail safety limits.

FIG. 5 is a flowchart illustrating a first example methodology 500 for a rail stress processing apparatus to determine rail safety limits for each rail portion of a continuous welded rail track, such as the CWR track 105 of rail system 100. According to the example methodology, at block 505 a target RNT is identified for a particular portion of a continuous rail. The longitudinal stress of the rail portion is monitored at block 510, and the ambient rail temperature of the rail portion is monitored at block 515. In the example rail network 100 illustrated in FIG. 1, such longitudinal stress and ambient rail temperature are monitored by rail monitoring device 140 and transmitted to the rail stress processor 130. Using the ambient rail temperature and the longitudinal stress of the rail portion, a present RNT is determined at block 520 given the relationship illustrated in FIG. 3.

The methodology provides at block 525 that the present RNT is compared to the target RNT to obtain a temperature difference which may be indicative of a track buckle or other failure. If the temperature difference is within a predetermined range (block 530), an alert is reported (block 535) indicating a potential safety issue associated with the predetermined range. Of course, a predetermined range could be defined as an open-ended range, such that when the temperature difference exceeds or otherwise crosses a predetermined threshold, the temperature difference is said to be within the predetermined range. Such a predetermined threshold value could further be crossed in either a positive or a negative direction.

Figure 6:
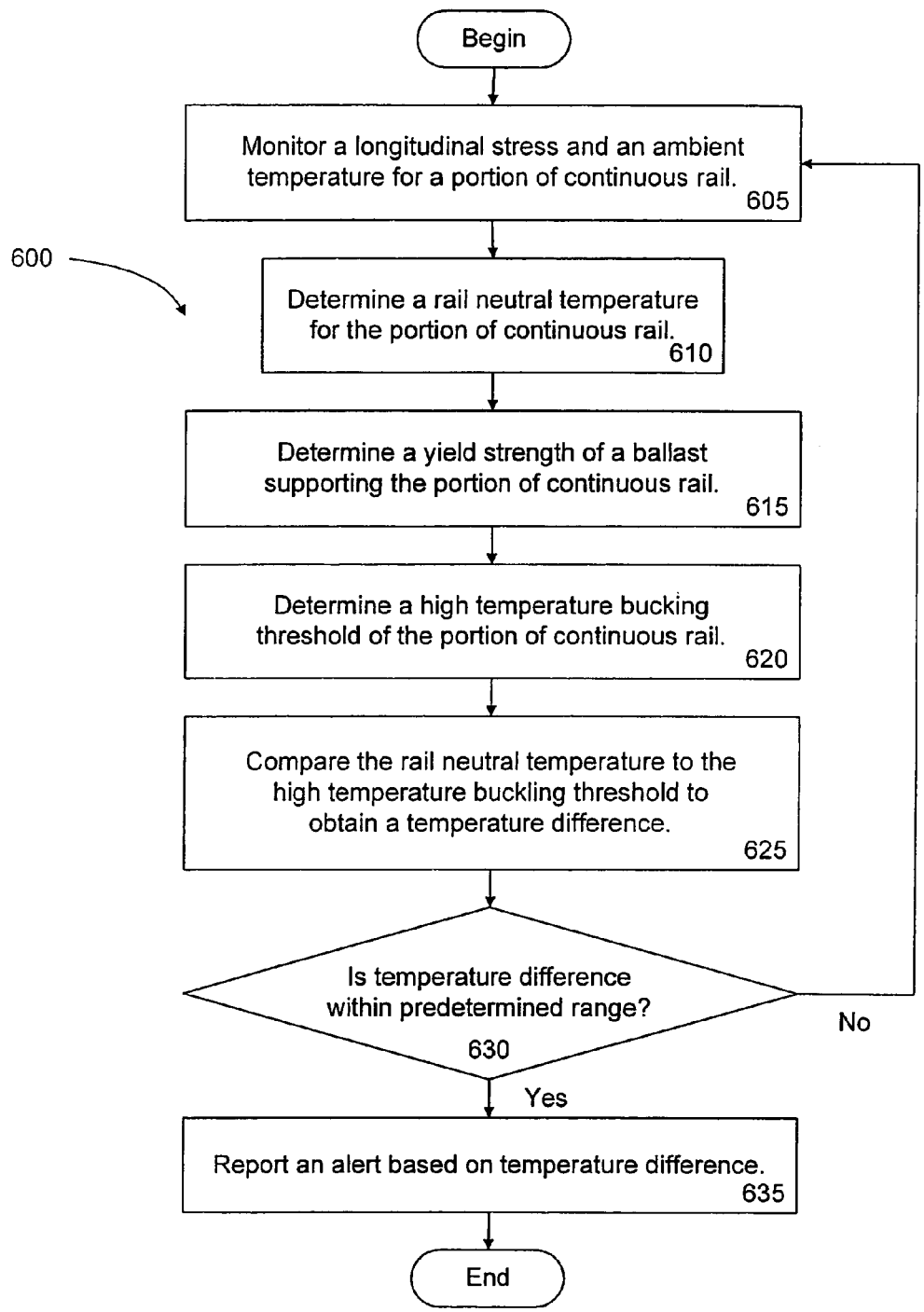
FIG. 6 is a flowchart illustrating a second example methodology for determining rail safety limits.

FIG. 6 is a flowchart illustrating a second example methodology 600 for a rail stress processing apparatus to determine rail safety limits for each rail portion of a continuous welded rail track, such as the CWR track 105 of rail system 100. According to the example methodology, at block 605 a longitudinal stress and an ambient rail temperature is monitored or otherwise determined for a particular portion of a continuous rail. In the example rail network 100 illustrated in FIG. 1, such longitudinal stress is monitored by rail monitoring device 140 and transmitted to the rail stress processor 130. The rail neutral temperature of the rail portion is determined at block 610 using the ambient rail temperature and the longitudinal stress of the rail portion, given the relationship illustrated in FIG. 3.

At block 615, a yield strength is determined for a ballast supporting the continuous rail portion, and at block 620, a high temperature buckling threshold is determined based on the data collected at blocks 605, 610 and 615. The high temperature buckling threshold may be determined according to a mathematical function of such data or based on a lookup table using the data collected at blocks 605, 610 and 615 as an index into the table. The lookup tables may be populated based on historical rail failure data collected under the specific conditions associated with the indices.

The methodology provides at block 625 that the RNT is compared to the temperature buckling threshold to obtain a temperature difference. If the temperature difference is within a predetermined range (block 630), an alert is reported (block 635) indicating a potential safety issue associated with the predetermined range.

Accordingly, the present application describes methods, apparatus and systems for determining the safe limit of CWR track based on temperature and rail stress. By observing the current rail neutral temperature, ambient rail temperature and the longitudinal stress in the rail, a yield strength of the ballast holding the track panel can be determined, particularly in curves. By observing this yield strength over various conditions and with the aid of analytical models, the yield stress or an adjusted proportion of same can be added to RNT to establish a high temperature buckling threshold for purposes of signaling maintenance work or changes in train operations until said conditions are alleviated. Examples of analytical models that may be employed include models provided by a track operating manual, models created based on actual track measurements over time, and mathematical models, such as models created by the U.S. Department of Transportation.

Factors potentially influencing the yield strength of track panel within ballast include: curvature, superelevation, ballast type and condition, ballast shoulder width, eccentricity of rail alignment, tie size, weight and spacing. By this method, nearly all these factors are accommodated within the observed behavior in a manner not economically duplicated by other means. As described, a lookup table with track curvature and other easily known factors may be employed to tune the safety margin to an acceptable level for a railroad's standard practices.

What has been described above includes several examples. It is, of course, not possible to describe every conceivable combination of components or methodologies for purposes of describing the systems, apparatus, methods, and computer readable media associated with determining rail safety limits. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed:

1. A system for monitoring rail portions used on railroads, comprising:
    (a) a plurality of monitoring devices, wherein each of the plurality of rail monitoring devices is mounted on a length of rail, wherein each of the plurality of rail monitoring devices further includes:
        (i) means for monitoring longitudinal stress of the rail portion; and
        (ii) means for monitoring ambient temperature of the rail portion; and
    (b) a receiver in communication with each of the plurality of rail monitoring devices, wherein the receiver is operative to both receive rail data collected from each of the rail monitoring devices and transmit rail data to a processing apparatus; and
    (c) a processing apparatus in communication with the receiver for receiving and processing rail data, wherein the processing apparatus further includes:
        (i) means for identifying a target rail neutral temperature for a rail portion;
        (ii) means for determining a present rail neutral temperature for the rail portion, wherein the present rail neutral temperature is based on the longitudinal stress and the ambient temperature;
        (iii) means for comparing the present rail neutral temperature to the target rail neutral temperature and determining a difference therebetween; and
        (iv) means for predicting a rail maintenance condition or a rail safety condition based on:
            a) the difference between the present rail neutral temperature and the target rail neutral temperature; and
            b) previously collected rail data, wherein the previously collected rail data includes data gathered over time from the rail portions on which the rail monitoring devices are mounted and historical rail failure data collected from analytical models based on actual track measurements over time and mathematical models created by regulatory entities; and
    (d) means for issuing alerts based on the prediction that a rail maintenance condition or a rail safety condition exits for preventing train accidents on the rail.

2. The system of claim 1, wherein the processing apparatus is further operative to report a suggested maximum vehicle speed for one of the plurality of portions of rail.

3. The system of claim 1, wherein the processing apparatus is further operative to determine a high temperature buckling threshold.

4. The system of claim 3, wherein the processing apparatus determines a high temperature buckling threshold according to historical mathematical models.

5. The system of claim 1, wherein the processing apparatus is further operative to determine a yield strength associated with each of the plurality of rail portions.

6. The system of claim 1, wherein a rail maintenance condition represents a non-catastrophic rail failure condition and wherein a rail safety condition represents a catastrophic rail failure condition.

7. A system for monitoring rail portions used on railroads, comprising:
    (a) means for monitoring longitudinal stress of a rail portion;
    (b) means for monitoring ambient temperature of the rail portion; and
    (c) means for identifying a target rail neutral temperature for the rail portion;
    (d) means for determining a present rail neutral temperature for the rail portion, wherein the present rail neutral temperature is based on the longitudinal stress and the ambient temperature;
    (e) means for comparing the present rail neutral temperature to the target rail neutral temperature and determining a difference therebetween;
    (f) means for predicting a rail maintenance condition or a rail safety condition based on:
        (i) the difference between the present rail neutral temperature and the target rail neutral temperature; and
        (ii) previously collected rail data, wherein the previously collected rail data includes data gathered over time from rail portions and historical rail failure data collected from analytical models based on actual track measurements over time and mathematical models created by regulatory entities; and
    (g) means for issuing alerts based on the prediction that a rail maintenance condition or a rail safety condition exits for preventing train accidents on the rail.

8. The system of claim 7, wherein the system further comprises means for determining rail performance criteria, and wherein the rail performance criteria include high temperature buckling threshold, yield strength, and suggested maximum vehicle speed across a plurality of rail portions.

9. The system of claim 7, wherein a rail maintenance condition represents a non-catastrophic rail failure condition and wherein a rail safety condition represents a catastrophic rail failure condition.

10. A method for monitoring rail portions used on railroads, comprising:
    (a) monitoring longitudinal stress of a rail portion;
    (b) monitoring ambient temperature of the rail portion; and
    (c) identifying a target rail neutral temperature for the rail portion;
    (d) determining a present rail neutral temperature for the rail portion, wherein the present rail neutral temperature is based on the longitudinal stress and the ambient temperature;
    (e) comparing the present rail neutral temperature to the target rail neutral temperature and determining a difference therebetween;

(f) predicting a rail maintenance condition or a rail safety condition based on:
  (i) the difference between the present rail neutral temperature and the target rail neutral temperature; and
  (ii) previously collected rail data, wherein the previously collected rail data includes data gathered over time from rail portions and historical rail failure data collected from analytical models based on actual track measurements over time and mathematical models created by regulatory entities; and
(g) issuing alerts based on the prediction that a rail maintenance condition or a rail safety condition exits for preventing train accidents on the rail.

11. The method of claim 10, further comprising determining rail performance criteria, and wherein the rail performance criteria include high temperature buckling threshold, yield strength, and suggested maximum vehicle speed across a plurality of rail portions.

12. The system of claim 10, wherein a rail maintenance condition represents a non-catastrophic rail failure condition and wherein a rail safety condition represents a catastrophic rail failure condition.

* * * * *